United States Patent [19]

Schmidhammer et al.

[11] 4,388,278
[45] Jun. 14, 1983

[54] PURIFICATION BY HYDROGENATION OF HYDROGEN CHLORIDE CONTAINING ACETYLENE OBTAINED BY THE THERMAL CRACKING OF 1,2-DICHLOROETHANE

[75] Inventors: Ludwig Schmidhammer, Haiming; Gerhard Dummer, Burgkirchen; Rudolf Straszer, Burghausen, all of Fed. Rep. of Germany

[73] Assignee: Wacker Chemie GmbH, Munich, Fed. Rep. of Germany

[21] Appl. No.: 316,521

[22] Filed: Oct. 29, 1981

[30] Foreign Application Priority Data

Nov. 18, 1980 [DE] Fed. Rep. of Germany ....... 3043442

[51] Int. Cl.$^3$ ............................................. C01B 7/07
[52] U.S. Cl. .................................. 423/488; 570/246; 570/248
[58] Field of Search ........................................ 423/488

[56] References Cited

U.S. PATENT DOCUMENTS

| | | | |
|---|---|---|---|
| 3,446,586 | 5/1969 | Young | 423/488 |
| 3,923,963 | 12/1975 | Rideout | 423/488 |
| 4,065,513 | 12/1977 | Miller | 423/488 |
| 4,206,188 | 6/1980 | Megerle | 423/488 |

FOREIGN PATENT DOCUMENTS

| | | | |
|---|---|---|---|
| 1568679 | 3/1970 | Fed. Rep. of Germany | 423/488 |
| 2353437 | 5/1975 | Fed. Rep. of Germany | 423/488 |
| 2438153 | 2/1976 | Fed. Rep. of Germany | 423/488 |
| 3037047 | 4/1981 | Fed. Rep. of Germany | 423/488 |
| 1405714 | 9/1975 | United Kingdom | 423/488 |

*Primary Examiner*—Brian E. Hearn
*Attorney, Agent, or Firm*—Burgess, Ryan and Wayne

[57] ABSTRACT

The invention is a process for the purification of hydrogen chloride formed during the thermal cracking of 1,2-dichloroethane, by hydrogenating the acetylene impurities with excess hydrogen, at pressures of from 8 to 20 bar absolute and at temperatures of from 120° to 180° C., using platinum or palladium supported catalysts, wherein, according to the invention, carrier materials having a specific surface area of not more than 5 m$^2$/g are used, the hydrogen excess used is a function of the acetylene content, the gas mixture, after reaching a temperature of approximately 70° C., is permitted a dwell time of not more than 0.8 second before it enters the catalyst, and the temperature, pressure and volume flow rates are dependent on one another within narrow limits.

The purified hydrogen chloride is used for oxychlorination.

5 Claims, No Drawings

PURIFICATION BY HYDROGENATION OF HYDROGEN CHLORIDE CONTAINING ACETYLENE OBTAINED BY THE THERMAL CRACKING OF 1,2-DICHLOROETHANE

The invention relates to a process for the purification of hydrogen chloride, formed during the thermal cracking of 1,2-dichloroethane by hydrogenating the acetylene admixed with the hydrogen chloride, as an impurity, with excess hydrogen, at pressures of from 8 to 20 bar absolute, the gas mixture being charged with hydrogen, conveyed to a heating device, and then transferred to a reactor charged with a supported catalyst containing a composition selected from the group consisting of metallic platinum and palladium, the oxides and mixtures thereof.

BACKGROUND OF THE INVENTION

In the industrial processes for the manufacture of vinyl chloride, 1,2-dichloroethane is cracked at elevated temperatures and pressures to form vinyl chloride and hydrogen chloride. The hydrogen chloride formed is used for the oxychlorination of ethylene to form additional 1,2-dichloroethane.

In the pyrolysis of 1,2-dichloroethane, acetylene is formed, generally in quantities of from about 0.05 to 0.5 mole %, and is entrained in the pyrolytically obtained hydrogen chloride. Since acetylene reacts under oxychlorination conditions, to form products which are difficult to separate from the reaction mixture, and which also impair the polymerization of vinyl chloride, it has to be removed.

The quantities of acetylene formed are, however, too small for their recovery to be economically worthwhile, or for conversion with subsequent separation. It has therefore been proposed to hydrogenate the acetylene impurities in the hydrogen chloride. The conversion products thus formed—ethylene and ethane—do not interfere in the oxychlorination process.

DE-OS 23 53 437 describes a hydrogenation process in which the hydrogenation is carried out at flow rates of from 7000 to 15,000 parts by volume of gas per part by volume of catalyst per hour (calculated at 15.6° C. and 1 atmosphere), in at least two consecutive catalyst zones. In that case, the catalyst system has an activity profile that rises in the direction of the product flow.

That process of DE-OS 23 53 437 is, however, practicable only when used at relatively low pressures. After only a few months' operation, using an active catalyst at pressures of 8 bar absolute and above, leads to permanent deactivation of the catalyst as a result of the deposition of carbon black formed by acetylene decomposition.

DE-AS 15 68 679 proposes that the acetylene be removed from the hydrogen chloride by hydrogenation with platinum or palladium catalysts. The reaction parameters may vary within side limits; reaction temperatures of from 50° to 200° C., flow rates of from 300 to 5000 parts by volume of gas per part by volume of catalyst, hydrogen additions of from 2-fold to 5-fold molar excess (based on the quantity of acetylene), and pressures of up to 211 atmospheres absolute, but preferably from 1.4 to 7 atmospheres, are mentioned. Furthermore, according to the above-mentioned specification, supported catalysts based on any known carrier support material may be used.

It has been found however that, although in principle, operation under the conditions disclosed in DE-AS 15 68 679 is possible, the hydrogenation process can be carried out economically, over a relatively long period, only at pressures of up to a maximum of 7 bar absolute. Operation at higher pressures causes deactivation of the catalyst which results from the deposition of carbon black, and necessitates frequent change of the expensive noble-metal-based catalyst, loss of selectivity, with the resulting increased formation of ethane (instead of the desired ethylene), which is of no value, as well as increased formation of undesired hydrochlorination products of acetylene and ethylene.

On the other hand, in industrial processes for the manufacture of vinyl chloride, a pressure of 8 bar absolute and above is often used to react the hydrogen chloride in the oxychlorination stage (see DE-OS 14 93 213).

BRIEF DESCRIPTION OF THE INVENTION

The object of the invention is to provide a process for the purification of hydrogen chloride formed during the pyrolysis of 1,2-dichloroethane, by hydrogenating entrained acetylene at a pressure in the range of from about 8 to 20 bar absolute. The purified hydrogen chloride meets the requirements of a material for use in the oxychlorination process. The disadvantages described above—deposition of carbon black on the catalyst, reduction of the activity of the catalyst as well as the loss of selectivity and the formation of by-products—are substantially reduced, even when the catalyst has been used for several years under the relatively high pressures according to the process.

The present invention is directed to a process for the purification of hydrogen chloride formed during the thermal splitting of 1,2-dichloroethane by hydrogenating the acetylene impurities with excess hydrogen, at pressures of from about 8 to 20 bar absolute, said process being characterized in that (a) the molar ratio H of hydrogen used is a function of the content A of acetylene (in mole %) in the hydrogen chloride and is calculated (with a tolerance of ±5%) for the value of H according to the equation $$H = 10A + 1;$$

(b) the addition of hydrogen to the process takes place near the heating device;

(c) the dwell time t of the gas stream between reaching a temperature of approximately 70° C. and entering the catalyst bed is not more than 0.8 second;

(d) the temperature of the gas mixture leaving the reactor, can be used as a variable for controlling the heating device and is maintained between about 120° and 180° C., (e) the following parameters, viz., volume flow rate R (expressed in liters of gas (measured at standard temperature and pressure) per liter of catalyst per hour), temperature T (in K.) of the gas mixture leaving the reactor, and pressure p (in bar absolute), fulfill the condition $$T = \frac{388 - 0.5\,p}{1 - (2.78\,p + 11.3) \times 10^{-5} \times R/p}$$

with a tolerance of ±2% for T; and (f) oxidic types of aluminum, silicon and mixtures thereof that have a specific surface area of not more than 5 m²/g are used as the supporting material for the palladium, platinum, their oxides or mixtures thereof as the catalytic material.

DETAILED DESCRIPTION OF THE INVENTION

The hydrogen is added to the hydrogen chloride preferably before, and in any case not later than the time at which the temperature of the gas stream reaches about 70° C.

The hydrogen chloride formed during the thermal splitting of 1,2-dichloroethane, which has already been freed of vinyl chloride and unreacted 1,2-dichloroethane, and which is generally at a temperature of about 30° C., is fed at a pressure of from about 8 to 20 bar absolute to a reaction system to reduce the amount of acetylene impurities. The content of acetylene in the hydrogen chloride is generally between about 0.05 and 0.5 mole %.

The reaction system comprises a heating device, a hydrogen feed means arranged to introduce hydrogen into the hydrogen chloride stream, and a hydrogenation reactor.

The hydrogen chloride in which the acetylene content is to be reduced is mixed with hydrogen, raised to the desired temperature in a short dwell time in the heating device, fed to the catalyst bed in the hydrogenation reactor, and can then be used in the oxychlorination of ethylene to form 1,2-dichloroethane.

According to the invention, the following reaction conditions have to be observed:

1. The hydrogen chloride entering the hydrogenation reactor is heated to such an extent that its temperature on leaving the reactor is from about 120° to 180° C. The temperature of the mixture leaving the reactor thus serves as a variable for controlling the heating means.

2. The hydrogen chloride is charged with excess hydrogen in relation to its acetylene content. The numerical value H of the hydrogen feed to the process is obtained from the equation $$H = 10A + 1$$

in which A denotes the content of acetylene in the hydrogen chloride, expressed in mole % and H denotes the ratio mol $H_2$ feed:mol acetylene in the hydrogen chloride. The permitted tolerance is ±5% of the value calculated for H.

The hydrogen is preferably added, in proximity to the heating device, by means of a perforated cruciform mixer. It is possible to use pure hydrogen, which is generally at ambient temperature, or alternatively, hydrogen diluted with inert gases, such as methane, nitrogen, carbon dioxide and the like.

3. The dwell time of the gas mixture between reaching a temperature of approximately 70° C. and entering the catalyst bed must not be more than about 0.8 second. It is preferable to add the hydrogen to the hydrogen chloride before, or at least as soon as, the 70° C. temperature is reached.

In order to achieve the extremely short dwell time, the heating device must be of appropriate design. Insofar as a sufficiently large pressure reduction is available, depending on the type of process and apparatus, a single heat exchanger may be used. It is, however, often expedient to heat the hydrogen chloride in at least two separate heat exchangers. The hydrogen chloride is first passed through a preliminary heating zone, in which it is pre-heated to not more than about 70° C., and then passed to a superheater which heats the gas mixture to such an extent that the temperature of the gas leaving the reactor is from about 120° to 180° C.

In the arrangement, the hydrogen is preferably added as the hydrogen chloride enters the superheater.

Furthermore, the heating device and the hydrogenation reactor must be at a short distance from one another. It is preferable to place the heating device directly on the hydrogenation reactor in a vertical or horizontal arrangement, depending on the form of the catalyst bed.

4. It is also necessary to match the throughput to the temperature and pressure conditions and the catalyst volume used. According to the invention, the three process parameters, volume flow rate R, pressure p, and temperature T, are so coordinated that they satisfy the equation $$T = \frac{388 - 0.5p}{1 - (2.78p + 11.3) \times 10^{-5} \times R/p}$$

in which T denotes the temperature (in K.), of the hydrogen chloride stream leving the reactor, p denotes the pressure (in bar absolute) of the hydrogen chloride stream entering the reactor, and the volume flow rate R is the quantity of hydrogen chloride (in liters of gas measured at standard temperature and pressure per liter of catalyst volume per hour). The equation applies to the pressure and temperature ranges for operation of the process. For any given values for the pressure and volume flow rate, a variation of the temperature value of +2% is permissible.

5. The hydrogenation reactor contains an active catalyst carried on a support comprising an oxidic species of aluminium, silicon or mixtures thereof having a specific surface area of not more than 5 $m^2/g$. Examples of such carriers are quartz powder, α-aluminium oxide, silica, kaolin, and the like.

The active components of the supported catalyst are selected from the group consisting of metallic platinum, palladium, their oxides and mixtures thereof. The quantity of active components is from about 0.1% by weight to about 0.2% by weight, based on the total weight of catalyst.

The reactor may be in the form of a fixed bed or a fluidized bed. When using fluidized bed processes, the flow is from the bottom to the top of the reactor and in a fixed-bed arrangement, the flow is expediently from the top to the bottom. Accordingly, the heating device can be attached to the reactor.

According to the process of the invention, it is possible to prepare hydrogen chloride formed during the thermal splitting of 1,2-dichloroethane for use in an oxychlorination process with the catalyst material used for hydrogenating the acetylene impurities having a long service life even when relatively high pressures are used. With the process control according to the invention, it is possible to avoid substantial carbon deficits, expressed as the percent difference in the quantity of carbon before and after the reactor stage, and to convert undesired acetylene predominantly into ethylene. The carbon deficit is determined by subtracting the total weight of carbon in the exit gas from the total weight of carbon in the inlet gas and dividing the amount by the total weight of carbon in the inlet gas and multiplying the quotient by 100.

The invention will now be illustrated by the following examples and comparison examples. (The term $Nm^3$

EXAMPLE 1

Hydrogen chloride obtained from the thermal cracking of 1,2-dichloroethane having an acetylene content of 0.25 mole % was fed, in quantities of 8800 Nm$^3$/h, under a pressure of 9.5 bar absolute (measured on entering the reactor), to a reaction system comprising a preliminary heater, a superheater and a hydrogenation reactor. The hydrogen chloride passed first through the preliminary heater, operated with hot vapor condensate, in which the gas mixture reached a temperature of approximately 70° C. Immediately before entering the superheater, the gas mixture was charged, via a perforated cruciform mixer, with 77 Nm$^3$/h hydrogen (corresponding to about a 3.5 hydrogen: acetylene molar ratio, based on the acetylene to be reacted). In the superheater, the mixture charged with hydrogen was heated, by means of high-pressure steam, to such an extent that the temperature of the mixture on leaving the hydrogenation reactor was 158° C.

The superheater was mounted by means of flanges on the hydrogenation reactor in a vertical arrangement and the dwell time between the hydrogen chloride entering the superheater and entering the catalyst bed in the reactor was 0.47 second.

The hydrogenation reactor contained 3.15 m$^3$ of a supported catalyst containing 0.15% by weight of palladium on silica having a grain size of approximately 3 mm, a bulk density of 1600 kg/m$^3$ and a specific surface area of less than 1 m$^2$/g.

Under the operating conditions, the volume flow rate was 470 m$^3$ of hydrogen chloride per m$^3$ of catalyst per hour.

The gases leaving the hydrogenation reactor were analyzed by gas chromatography: less than 1 ppm by volume of acetlyene was found and the molar ratio of ethylene to ethane was 8.5:1. The formation of methane, butanes and butenes, which would have indicated the decomposition of the acetylene, was not observed.

The carbon deficit, expressed as the difference in the amount of hydrocarbons in the hydrogen chloride upstream and downstream of the hydrogenation reactor, was less than 2%.

Even over a period of 1.5 years, there was neither fouling nor any other impairment of the catalyst causing a decrease in capacity or loss of selectivity.

Comparison Example 1

The differences compared with Example 1 relate essentially to the feeding of hydrogen into the system and the dwell times of the mixture between the heating means and the hydrogenation reactor.

8000 Nm$^3$/h of hydrogen chloride having an acetylene content of 0.25 mole % were conveyed, at 9 bar absolute, to a superheater which heated the gas mixture to such an extent that the temperature of the mixture on leaving the reactor was 180° C. The same hydrogenation reactor as described in Example 1 was used. The superheater was not, however, mounted by means of flanges onto the reactor, but was arranged approximately 10 m upstream thereof. The dwell time in the superheater was 0.32 second, and between the superheater and entry into the catalyst bed it was 1.28 seconds, making a total dwell time of 1.6 seconds. The volume flow rate calculated under operating conditions, was approximately 467 m$^3$ gas per m$^3$ catalyst per hour. The hydrogen was added, in a 3.5 molar ratio, based on the acetylene, approximately 2 m upstream of the reactor inlet.

The gas leaving the reactor contained less than 1 ppm by volume of acetylene and the molar ratio of ethylene to ethane was 8.5:1. At the same time, however, the formation of approximately 5 ppm by volume of methane and 50 ppm by volume of butanes and butenes was observed, indicating acetylene decomposition. In addition, the carbon deficit (comparison upstream and downstream of the hydrogenation reactor) was approximately 15%. Over a period of 3 months, the molar hydrogen ratio had to be raised to values of 5 to 6 in order to be able to maintain the residual acetylene content downstream of the reactor at values of less than 1 ppm by volume. Over a further period of 3 months, it was no longer possible to keep below a residual acetylene content of 50 ppm by volume even when the molar hydrogen ratio was increased to a value of 10. In spite of further increasing the molar ratio of hydrogen:acetylene to values of 13 to 14 (for safety reasons, higher excesses are not permissible in the subsequent oxychlorination process), the residual acetylene content rose to 100 ppm by volume after a total of 1.5 years service life of the catalyst.

In addition, as the molar ratio of hydrogen:acetylene continued to be increased, a corresponding increase in the loss of selectivity was observed. After 1.5 years service life of the catalyst system, the molar ratio of ethylene to ethane was only 4:1. Since the capacity and the selectivity of the catalyst were gradually exhausted and the process therefore became uneconomical, the catalyst had to be changed. Examination of the spent catalyst revealed severe fouling of the catalytically active surface.

EXAMPLE 2

11.5 Nm$^3$/h hydrogen chloride having an acetylene content of 0.2 mole % were conveyed to a hydrogenation reactor which was filled with 3.2 liters of hydrogenation catalyst corresponding to Example 1. The hydrogen chloride was pre-heated in a heat exchanger which was fitted in a horizontal arrangement immediately upstream of the reactor. The hydrogen chloride was heated to such an extent that the temperature of the mixture on leaving the reactor was 167° C. The pressure on entry was 12.5 bar absolute. The dwell time between the time the hydrogen chloride entered the superheater and the time the hydrogen chloride entered the catalyst bed was 0.5 second and the volume flow rate was 3800 liters of gas per liter of catalyst per hour (calculated at 15.6° C. and 1 atmosphere). The hydrogen was added, immediately before entry into the superheater, in a quantity of 3 moles per mole of acetylene present.

No acetylene was detected in the gas being discharged and the molar ratio of ethylene to ethane was 8:1. The formation of methane, butanes and butenes, which would have indicated acetylene decomposition, was not observed.

Comparison Example 2

The procedure was analogous to that of Example 2. The hydrogen was, however, added downstream of the superheater, but upstream of the reactor.

The gas being discharged did not contain acetylene and the molar ratio of ethylene to ethane was 8:1. The formation of 2 ppm by volume of methane and 5 ppm by volume of butanes and butenes was observed, however, which indicated acetylene decomposition or dimerisation or hydropolymerization.

EXAMPLE 3

4 Nm³/h of hydrogen chloride having a content of 0.15 mole % of acetylene were conveyed to a hydrogenation reactor filled with 3.2 liters of hydrogenation catalyst. A supported catalyst based on α-aluminium oxide having a specific surface area of 1 m²/g, with 0.15% by weight of palladium as the active component, was used.

The temperature to which the hydrogen chloride was pre-heated was such that the temperature of the mixture on leaving the reactor was 131° C.; the molar ratio of hydrogen:acetylene, was 2.5 and the volume flow rate was adjusted to 1321 liters of gas per liter of catalyst per hour (calculated at 15.6° C. and 1 atmosphere). The hydrogen was in each case added immediately before the hydrogen chloride entered the superheater, which was arranged directly on the reactor. The pressure of the gas on entering the reactor was 9 bar absolute.

The gas mixture leaving the reactor was examined for its content of vinyl chloride and ethyl chloride.

90 ppm by weight of vinyl chloride and 3 ppm by weight of ethyl chloride were detected.

Comparison Example 3

The method described in Example 3 was repeated except that a carrier catalyst based on an aluminium oxide having a specific surface area of 30 m²/g was used.

150 ppm by weight of vinyl chloride and 100 ppm by weight of ethyl chloride were detected.

A comparison of the data from Example 3 with that from Comparison Example 3 shows that the formation of byproducts (hydrochlorination products) depends on the specific surface area of the catalyst material at elevated pressures.

Comparison Example 4

The method described in Comparison Example 3 was repeated except that the pressure of the mixture on entering the rector was 3.5 bar absolute.

80 ppm of vinyl chloride and 2 ppm of ethyl chloride were detected.

A comparison of the data from Comparison Example 3 with that from Comparison Example 4 shows that the problems of forming hydrochlorination products occur only at relatively high pressures.

EXAMPLE 4

8.8 Nm³/h of hydrogen chloride having an initial acetylene content of 0.05 mole % were conveyed to a hydrogenation reactor filled with 3.2 liters of hydrogenation catalyst (0.1% by weight platinum on α-aluminium oxide having a grain size of 3.2 mm and a specific surface area of less than 1 m²/g). The superheater was so regulated that the temperature of the gas mixture on leaving the reactor was 158° C. The pressure of the gas on entering the reactor was 9 bar absolute, and the numerical value of mol ratio of hydrogen:acetylene was 1.5.

After the mixture had been discharged from the reactor, a molar ratio of ethylene to ethane of 8:1 was found.

EXAMPLE 5

The method described in Example 4 was repeated, except that the acetylene content was 0.20 mole % and the numerical value of the mole ratio of hydrogen:acetylene was 2.9.

The molar ratio of ethylene to ethane after the mixture had been discharged from the reactor was 9:1.

Comparison Example 5

The method described in Example 4 was repeated, except that the numerical value of the molar ratio of hydrogen:acetylene was 3.5.

The molar ratio of ethylene to ethane was 5:1.

Comparison Example 6

The method described in Comparison Example 5 was repeated, except that the pressure of the gas on entering the reactor was 3.5 bar absolute.

A ratio of ethylene to ethane of 9:1 was found.

Comparison Example 7

The method described in Example 5 was repeated, except that the numerical value for the molar ratio of hydrogen:acetylene was 3.5.

The ratio of ethylene to ethane was found to be 5:1.

A comparison of the results of Examples 4 and 5 and Comparison Examples 5, 6 and 7 shows that the use of a hydrogen excess outside the range according to the invention results in the loss of selectivity but that these problems occur only at relatively high pressures.

We claim:

1. A process for reducing the amount of acetylene in a hydrogen chloride stream obtained from cracking of 1,2-dichloroethane, at a pressure of from 8 to 20 bar absolute by hydrogenating the acetylene in a catalytic reactor which comprises:

(a) mixing hydrogen with the hydrogen chloride stream containing acetylene, at a temperature below about 70° C., and at about a molar ratio H, of hydrogen:acetylene, determined according to equation I;

$$H = 10A + 1 \qquad \text{I}$$

wherein A is the molar percent of acetylene in the hydrogen chloride stream;

(b) heating the hydrogen chloride stream mixed with hydrogen to a temperature to provide a gas stream, at the outlet of the catalytic reactor, at about a temperature T, between about 120° C. and 180° C., said temperature T being determined according to equation II;

$$T = \frac{388 - 0.5 p}{1 - (2.78 p + 11.3) \times 10^{-5} \times R/p}$$

wherein
(1) T is the temperature in degrees Kelvin of the gas mixture leaving the reactor;
(2) R is the volume flow rate expressed as liters of gas, measured at standard temperature and pressure per liter of catalyst per hour; and
(3) P is the pressure of the gas mixture in bar absolute, and wherein the dwell time of the gas mixture, at a temperature of above about 70° C., before entering the catalyst bed is not more than 0.8 seconds, (c) contacting the hydrogen chloride stream containing hydrogen with a catalyst comprising platinum, palladium, their oxides or mixtures thereof supported on a carrier comprising an oxide of aluminium, an oxide of silicon or mixtures thereof having a specific surface area of not more than 5 m²/g.

2. The process according to claim 1 wherein the catalyst comprises platinum supported on α-aluminum oxide.

3. The process of claim 1 wherein the catalyst comprises palladium supported on α-aluminum oxide.

4. The process according to claim 1 wherein the catalyst comprises palladium supported on silica.

5. The process according to claim 1 further comprising passing the hydrogen chloride stream having a reduced acetylene content to an ethylene oxychlorination process.

* * * * *